Jan. 16, 1945.   C. E. HEMMINGER   2,367,351
APPARATUS FOR REGENERATING CONTACT MATERIAL
Original Filed Aug. 2, 1941
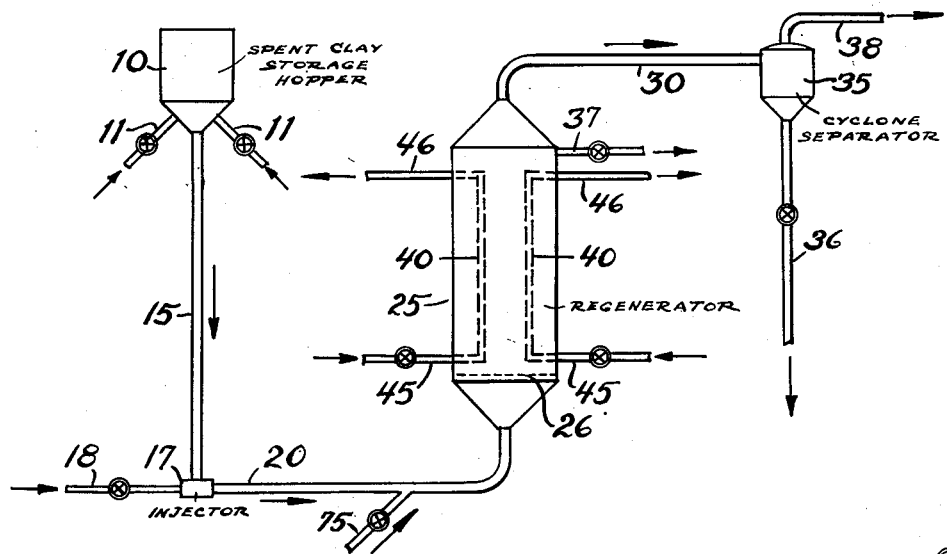
FIG.-1
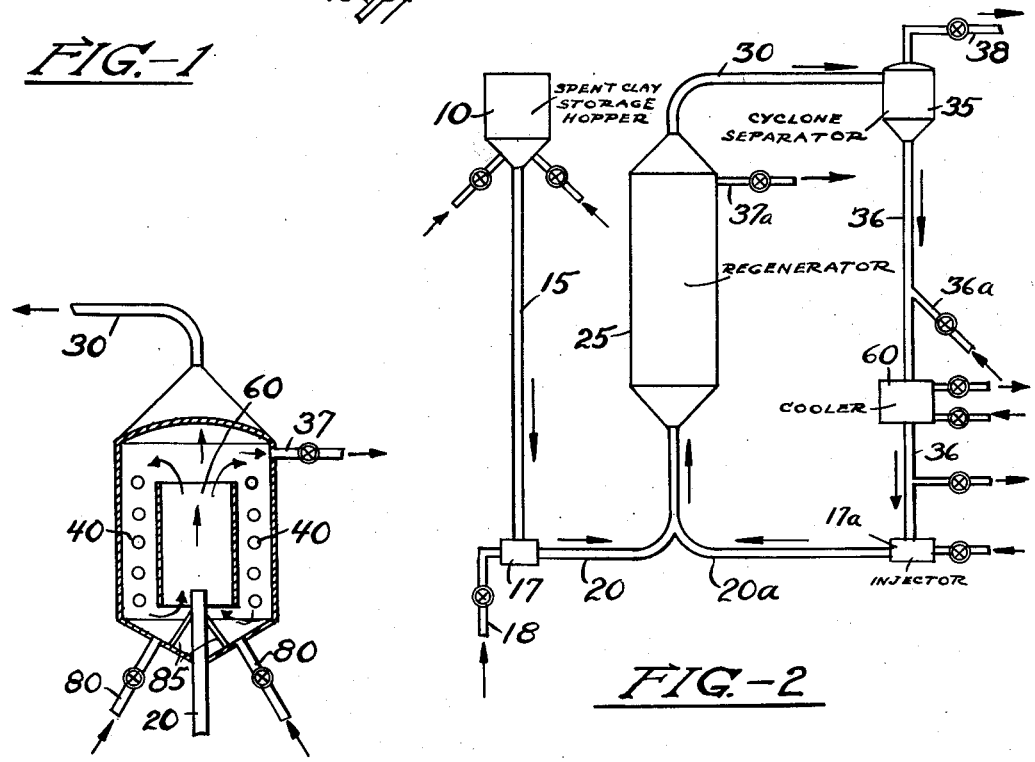
FIG.-2
FIG.-3
Charles E. Hemminger Inventor
By P. L. Young Attorney Patented Jan. 16, 1945

2,367,351

UNITED STATES PATENT OFFICE 2,367,351

APPARATUS FOR REGENERATING CONTACT MATERIAL

Charles E. Hemminger, Westfield, N. J., assignor to Standard Oil Development Company, a corporation of Delaware Original application August 2, 1941, Serial No. 405,139. Divided and this application February 10, 1942, Serial No. 430,179

4 Claims. (Cl. 23—288)

My present application is a division of my prior application Serial No. 405,139, filed August 2, 1941.

The present invention relates to improvements in apparatus for contacting solid material with gas and, more particularly, it relates to an apparatus in which the combustion of the contaminating materials deposited on clays during use in the cracking or refining of hydrocarbon oils may be accomplished.

In refining hydrocarbon oils, including gasoline and the heavier oils such as lubricating oils, it is common practice to subject the said oils in the later stages of their manufacture to treatment with an adsorbent clay, such as "Super-filtrol," Attapulgus clay, fuller's earth, and the like. During such treatments, the adsorbent material becomes contaminated with gummy deposits where the operation is carried out in the cold or slightly elevated temperatures, and where the operation is carried out at higher temperatures, the contaminants are usually hard and cokey. Where the operation involves cracking of a hydrocarbon oil in the presence of a catalyst, the catalyst becomes progressively contaminated with carbonaceous coke-like deposits, and there comes a time when the catalyst must be removed from the cracking zone and purified, usually by causing combustion of the contaminants in the presence of an oxygen-containing gas such as air or air diluted with steam or flue gas. Whether the contaminants on the clay are the result of low or high temperature contact with hydrocarbon oils, the present invention is designed to regenerate or purify the clay under controlled conditions of temperature so as to quickly revivify the clay without impairing its efficiency in the process.

One object of my invention, therefore, is to regenerate or revivify a solid adsorbent material under closely controlled temperature conditions.

Another object of my invention is to regenerate a spent or poisoned clay which is in the form of a powder, by causing the powder to be agitated violently in an oxidizing gas under closely controlled conditions of temperature, gas velocity, and exposure to the oxidizing gas in order to effect a rapid and non-injurious purification of the said clay.

My present invention will be best understood by reference to the accompanying drawing in which Fig. I is a diagrammatic showing of a so-called "hindered settler" regenerator adapted to regenerate clay according to my present invention, together with such accessory apparatus as are necessary to feed and withdraw clay from the regenerator; Fig. II shows a modification of the arrangement shown in Fig. I; and Fig. III is an enlarged showing of a preferred form of regenerator. Similar reference characters refer to similar parts throughout the several views.

Referring in detail to Fig. I, a spent clay which is fluidized in a storage hopper 10 by gases admitted through line 11, is withdrawn from said hopper through a standpipe 15 or equivalent device and discharged into an injection means 17, into which air or some other oxidizing gas is also discharged through pipe 18. The fluidized or suspended clay resulting from the confluence of the air and the clay in injector 17 is withdrawn through line 20 and thence discharged into the bottom of a regenerator 25 through grid 26 where the air and clay pass upward, the linear velocity of the air stream in 25 being so regulated, as will hereinafter appear, as to cause criss-cross flow and violent agitation of the clay, the net result being that the clay proceeds upwardly at a net velocity lower than that of the air. The flue gas formed by chemical reaction by the air and contaminants on the spent clay is withdrawn overhead through line 30 and passes through a cyclone separator 35, where the separated clay is withdrawn through line 36, while the flue gas is withdrawn through line 38. Due to the turbulent, agitated motion of the catalyst in regenerator 25, where the gas velocity is slow enough to permit slippage of catalyst, there exists in the regenerator a dense phase of catalyst, i. e., a condition in which the catalyst and regeneration gas form a much denser or heavier mass than in say inlet pipe 20. Consequently, it is possible to draw-off regenerated catalyst from the regenerator through pipe 37 or from any other lower point in the regenerator, thus obviating the necessity of recovering the bulk of the catalyst through cyclone separator 35.

Referring again to the flue gas in line 38, the same may still and usually does contain catalyst and ordinarily this flue gas is forced through two or more additional cyclone separators for complete removal of catalyst. Or, if desired, say two cyclone separators may be used in series, followed by an electrical precipitator, which latter device is adapted to remove very finely divided catalyst, ordinarily difficult to remove by means of a cyclone separator.

Since the regeneration reaction taking place in regenerator 25 is an exothermic oxidation of the carbonaceous or combustible deposits on the clay, heat is evolved, and an important feature of my invention involves withdrawing or adsorbing at least a portion of the heat of reaction released in the regeneration zone by means of a cooling fluid discharged into said regenerator and forced therethrough in heat exchange relationship with the clay undergoing regeneration. For example, I provide within the regenerator a plurality of spaced tubes 40 disposed within the regenerator. Usually and conveniently, the regenerator is in the form of a cylinder (except for its upper and lower portions) and I propose to dispose the tubes vertically in an annulus, as shown. Water is forced into the tubes through line 45 and withdrawn through line 46, usually as steam. I have observed that under the conditions I have stated, there is an excellent heat transfer from axially disposed particles of clay to the tube walls and, consequently, I am enabled to closely control the temperature of the clay undergoing regeneration by regulating the quantity and the temperature of the water or other tempering fluid. My invention is not limited to the use of water as a cooling medium. I may use mercury, molten salts, etc. Also, the cooling tubes may be horizontally disposed.

In Fig. II, I have shown a modification of my invention in which I may control the temperature of the regeneration taking place in 25 by recycling a portion of the regenerated clay, after cooling, to the regenerator 25 by means of standpipe 36 or equivalent repressuring device. In other words, in the modification in Fig. II, I omit the cooling tubes 40, and I recycle a portion of the regenerated clay through a cooler 60, thence into injector 17—a, thence through line 20—a into line 20, and thereafter into the regenerator 25. The clay in line 36 as withdrawn from the cyclone separator 35 may be at a temperature of from 1000°–1050° F., and this clay is cooled to a temperature as low as 300°–500° F. in cooler 60. The thus cooled clay, when mixed in the proportion of say ½ to 10 parts by weight of spent clay per part of cooled regenerated clay, serves to temper the reaction in regenerator 25, by virtue of the fact that the regenerated clay absorbs heat released by the oxidation of the contaminants on the unregenerated clay; otherwise, the operation performed in the apparatus of Fig. II is the same as that carried out in Fig. I. Again, the clay may also be withdrawn in the dense phase from regenerator 25 through line 37—a which may be at any height in vessel 25.

In Fig. III, I have shown in detail a preferred form of regeneration vessel. The regeneration vessel 25 consists of a cylindrical shell having a conical top and base. Within the shell there is a concentrically disposed pipe or flue 60. The feed pipe 20 projects into the regenerator 25 to a point above the bottom of the flue 60 and is substantially concentric therewith in the drawing, although the latter feature is not essential. Tubes 40 adapted to contain a cooling fluid are shown horizontally disposed within the regeneration vessel, but they may be vertically disposed as shown in Fig. I. Integral with the conical base of the regeneration vessel and pipe 20 are flow directing baffles 85 which aid in causing the type of flow in the said vessel, presently to be described.

In this modification the flow of the clay undergoing treatment is indicated by the arrows. The suspension enters the bottom of the regenerator through line 20 which extends to at least the bottom of a concentrically disposed flue or pipe 60. The velocity of the gases and powder decreases when leaving the top of cylinder 60 and a portion of the powder flows downwardly and reenters the flue 60 as indicated by the arrows. Eventually, however, the powder is withdrawn as before through a conduit 38 or through line 37 in the dense phase anywhere along height of vessel. In this modification the tubes may be horizontally or vertically disposed. Under the conditions indicated, the clay is in a dense phase within the reactor, the upper and lower levels of which conform approximately to the upper and lower edges of the flue 60. Air, steam or other gases may be introduced through lines 80 to assist in the internal circulation.

Having described my invention in a general way, it is necessary to disclose at this point, the operating conditions prevailing within the regenerator 25 in the various modifications. First, the concentration of clay in the regenerator is such that it has a weight of 5–30 lbs./cu. ft. in the dense phase, and this condition is obtainable where the clay has a particle size of from 50–400 mesh, by maintaining the gas velocity in the reactor in the range of from about 0.5–5 ft./second. If the clay has a particle size of the order of 10–50 mesh, I have found that the preferred gas velocity is 3–4 ft./second, in which case the concentration in the dense phase will be from 10–25 lbs./cu. ft.

As to the temperatures prevailing within the regenerator, they should be maintained somewhere within the range of from 800°–1200° F., and preferably a pressure of 3–50 lbs./sq. in. should be maintained. Furthermore, the clay should remain in the reactor for a period of from 10–100 minutes in order to effect the desired burning or oxidation of the contaminated material.

Numerous modifications of my invention may be made without departing from the spirit thereof. For example, I may control temperature conditions in the regenerator by the combined expedient of cooling tubes containing a cooling fluid and recycling cooled regenerated clay to the regenerator. Furthermore, I may safely inject water directly into the mass undergoing regeneration in controlled amounts, and because of the violent motion of the individual particles and therefore the intimate mixing of the catalyst particles, direct addition of water in small amounts will not extinguish the burning or oxidation; if it so happens that any localized portion is cooled below the ignition temperature of the contaminants, it is immediately mixed with hot material and reheated and thus a uniform temperature is maintained substantially continuously throughout the mixture, despite the momentary existence of cold surfaces on the clay. Cooled flue gases, free or mixed with clay, may also be recycled.

Furthermore, since, of course, the heat released in the regenerator depends upon the carbon on the clay and therefore available for combustion, in those cases where the amount of contaminating combustible material is small, it may be necessary to add a combustible gas whose combustion will supply sufficient heat to maintain the catalyst contaminants at active ignition temperatures. Furthermore, in this same connection, and particularly where the clay is one used in a cold treating operation, as where the clay is used to treat a lubricating oil, the spent clay entering the regenerator may be far below active ignition temperatures, and in those instances it is desirable, even necessary, to inject into the reactor, say through line 75, (in Fig. I), a quantity of a combustible gas, such as illuminating gas or waste refinery gases, in order to heat the clay by combustion of the said gases rapidly to temperatures at which the carbonaceous deposits will be rapidly consumed by combustion. Steam may also be added in proportions of 10-100% of clay fed to regenerator through line 75.

Another feature of my invention resides in the fact that regeneration is considered complete when the clay may still contain appreciable quantities of contaminating material, such as from 0.2 to 2.0% of carbonaceous materials. In this connection, I have found that the clay is sufficiently restored or purified in activity while still containing these quantities of carbonaceous materials, and I have further found that the removal of substantially all of the carbonaceous material is not economically feasible because the additional time of residence in the reactor necessary to remove the last traces of carbonaceous material is not compensatory in time and cost of materials for the added improvement in the clay. As a matter of fact, there is grave danger that reducing the carbonaceous content of the clay until it is virtually nil may unavoidably result in serious impairment of the clay. Also, in the case of regenerating a clay fouled in refining hydrocarbon oils, the latter may be regenerated by treatment with flue gas and steam, leaving considerable amounts of carbonaceous deposits on the clay whose activity has been restored by the treatment.

It is necessary to distinguish between a suspension of powder in a vertical high velocity stream and in a low velocity stream of gases which give "hindered settling," or slippage of catalyst with respect to gas. While there is slippage of particles in a gas stream moving at more than 5 feet per second velocity, so that the velocity of the particles is less than that of the gas, there is little or no internal mixing due to eddy currents. However, with velocities of less than 5 feet per second, say 0.5 to 3 feet per second preferred, there is violent mixing and frequently two distinct phases exist. The lower or dense phase of 5-30 lbs./cu. ft. is little changed in concentration by velocity or feed rates of powder, while its height is governed by both these factors. The top or light phase usually is less than 5 lbs./cu. ft.

The "hindered settling" disclosed may be identified by the following in addition to the limitation of gas velocities.

(1) The concentration in the dense phase is substantially independent of gas velocity and rate of powder feed.

(2) With an exothermic reaction little or no temperature differential exists throughout dense phase due to mixing.

(3) The analysis of outlet material is substantially the same as the material in the dense phase.

The merit of the invention primarily rests in the existence of the internal recirculation and agitation in the regenerator. Due to this phenomena localized overheating is avoided and cooling media cooler than the ignition temperature of the clay may be employed. Moreover, the spacing of cooling elements can be greater. Also, the clay can be introduced cold and it is preheated by the hot clay in the vessel without any external equipment to bring the air or clay to ignition temperatures.

The invention is not limited to one vessel for regeneration but the desired results can be obtained by using several vessels in series without separation of the gas and powder. In fact, to obtain practically complete removal of the contaminating material, it is desirable to use several hindered settling zones in series so that the mixing is restricted to each zone and no feed material appears in the outlet material.

Many other modifications of my invention not specifically mentioned herein will suggest themselves to those who are familiar with this particular art.

What I claim is:

1. The combination of a regenerator comprising an enclosed casing, an open-ended flue concentrically disposed within, and having both ends spaced from, said casing, baffle plates disposed within said casing and below said flue, conduit means for withdrawing gasiform material from said regenerator, and a cooling means associated with said regenerator, with means for feeding solid material to be regenerated into said regenerator, comprising a hopper, a stand pipe connected to the bottom of said hopper, a feed pipe connected to the bottom of said stand pipe and projecting into the bottom of said flue, means for introducing gas into said feed pipe, and with centrifugal means, connected to said withdrawal conduit means, for separating said gases from said solid material.

2. The combination of a regenerator comprising an enclosed casing, an open-ended flue concentrically disposed within and having both ends spaced from said casing, baffle plates disposed within said casing and below said flue, conduit means for withdrawing gasiform material from said regenerator, with means for feeding solid material to be regenerated into said regenerator, comprising a hopper, a stand pipe connected to the bottom of said hopper, a feed pipe connected to the bottom of said stand pipe and projecting into the bottom of said flue, means for introducing gas into said feed pipe, and with centrifugal means connected to said withdrawal conduit for separating said gases from said solid material, conduit means for withdrawing separated solid material from said separator, means for cooling said separated solid material, and conduit means for recycling said solid material to said regenerator.

3. The combination of a regenerator comprising an enclosed casing, an open-ended flue substantially concentrically disposed and having both ends spaced from said casing, a plurality of tubes adapted to circulate fluid within the casing but out of direct contact with gasiform material in said flue, conduit means for withdrawing gasiform material from the upper end of said casing, with means for feeding solid material to be regenerated into said casing comprising a hopper, a stand pipe connected to the bottom of said hopper, a feed pipe connected to the bottom of said stand pipe projecting into the bottom of said flue, means for introducing gas into said feed pipe, and with centrifugal means connected to said withdrawal conduit means for separating said gases from said solid material.

4. The combination with a powdered clay feed hopper of a standpipe, of an injector in communication with the lower end of said stand pipe, of a regeneration gas feed pipe in communication with said injector, of a regenerator having a feed pipe in communication with said injector, said regenerator consisting of a cylindrical shell having conical top and base portions, of an open-ended flue concentrically disposed within and having both ends spaced from said shell, said feed pipe projecting into the bottom of said flue, of a grid disposed at the lower end of said cylindrical portion, of an exit pipe in communication with the top portion of said regeneration vessel for removing spent regeneration gas from said regeneration vessel, and with centrifugal separating means in communication with said exit pipe adapted to separate solid material from said gas, and of a plurality of horizontal tubes disposed in the form of an annulus within said cylindrical shell for the purpose of contacting a cooling fluid in heat exchange relationship with said regenerator.

CHARLES E. HEMMINGER.